(12) United States Patent
Bowen

(10) Patent No.: US 9,201,200 B2
(45) Date of Patent: Dec. 1, 2015

(54) OPTICAL ASSEMBLY WITH DIFFRACTIVE OPTICAL ELEMENT

(75) Inventor: Terry Patrick Bowen, Dillsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 366 days.

(21) Appl. No.: 13/558,991

(22) Filed: Jul. 26, 2012

(65) Prior Publication Data

US 2014/0029894 A1 Jan. 30, 2014

(51) Int. Cl.
G02B 6/42 (2006.01)
G02B 6/34 (2006.01)
G02B 6/30 (2006.01)

(52) U.S. Cl.
CPC ............. *G02B 6/4214* (2013.01); *G02B 6/30* (2013.01); *G02B 6/34* (2013.01); *G02B 6/4215* (2013.01)

(58) Field of Classification Search
CPC .. G02B 6/4214; G02B 6/4215; G02B 6/4219; G02B 6/4243; G02B 6/34
See application file for complete search history.

(56) References Cited

U.S. PATENT DOCUMENTS 5,479,540 A * 12/1995 Boudreau et al. ............... 385/14
6,483,967 B2 * 11/2002 Tang et al. ...................... 385/43
6,947,645 B2 * 9/2005 Korenaga et al. ............... 385/49
7,162,124 B1 * 1/2007 Gunn et al. ..................... 385/37
7,480,429 B1 * 1/2009 Chiniwalla et al. ............. 385/37
8,031,993 B2 * 10/2011 Bowen ............................ 385/38
8,548,288 B2 * 10/2013 Raj et al. ......................... 385/14
8,593,826 B2 * 11/2013 Joe et al. ........................ 361/783
2003/0118288 A1 * 6/2003 Korenaga et al. ............... 385/49
2006/0239612 A1 * 10/2006 De Dobbelaere et al. ...... 385/37
2009/0003762 A1 * 1/2009 Chiniwalla et al. ............. 385/14
2011/0026875 A1 2/2011 Bowen
2011/0069464 A1 * 3/2011 Joe et al. ........................ 361/783
2011/0134679 A1 6/2011 Suh et al.
2012/0189245 A1 * 7/2012 Bowen et al. ................... 385/14
2013/0156366 A1 * 6/2013 Raj et al. ......................... 385/14
2014/0029894 A1 * 1/2014 Bowen ............................ 385/37

OTHER PUBLICATIONS

International Search Report, International Application No. PCT/US2013/050444, International Filing Date Jul. 15, 2013.

* cited by examiner

*Primary Examiner* — Rhonda Peace

(57) ABSTRACT

An optical assembly comprising: (a) a crystalline substrate having a top planar surface and a crystalline plane angle; (b) at least one groove defined in the top planar surface and having side walls extending from an edge of the substrate to a terminal end, the groove having a first facet at the terminal, the first facet having a first angle relative to the top planar surface, the first facet being reflective; (c) an optical conduit having an optical axis and an end face optically coupled with the first facet; (d) a waveguide; and (e) a diffractive optical element (DOE) disposed above the first facet and configured to couple light between the waveguide and the optical conduit as reflected by the first facet.

23 Claims, 5 Drawing Sheets

OPTICAL ASSEMBLY WITH DIFFRACTIVE OPTICAL ELEMENT

FIELD OF INVENTION

The present invention relates generally to optical interfaces, and more particularly, to an optical assembly with light bending combined with a diffractive optical element to couple light between a light conduit and waveguide.

BACKGROUND OF INVENTION

The use of optical fibers as a medium for transmission of digital data (including voice, internet and IP video data) is becoming increasingly more common due to the high reliability and large bandwidth available with optical transmission systems. Fundamental to these systems are optical subassemblies for transmitting and/or receiving optical signals.

A common optical subassembly comprises an interposer integrated with an optical component, such as an opto electric device or a photonics integrated circuit (IC). As used herein, an interposer functions as a substrate for optical, opto-electrical, and electrical components and provides interconnections to optically and/or electrically interconnect the optical/opto-electrical/electrical components. A typical interposer may comprise a substrate comprising, for example, silicon, having one or more grooves formed therein for holding fibers precisely. A conventional groove is formed in the shape of a "V" by wet etching the substrate to include two sidewalls that retain the optical fiber along its length. Wet etching a crystalline material such as silicon results in a predictable and very precise etch along the crystalline planes of the material. For example, silicon has a crystalline plane at 54.7°, thus, the sidewalls and the end facet of a wet etched groove are formed at a precise angle of 54.7° from the reference surface.

The end facet of a conventional interposer V-groove can be metalized so that it may be used as a mirror to reflect light between the optical/opto-electrical component and the optical fiber retained in the V-groove. For example, an opto-electrical light source, which has been flip-chip mounted onto the interposer, emits a cone-shaped light beam onto the V-groove end facet mirror. The V-groove end facet mirror reflects the light through an end of the optical fiber retained in the V-groove.

As discussed above, the surface of a wet-etched V-groove end facet is at an angle of precisely 54.7° from the reference surface. As such, light is reflected off the groove end facet mirror through the optical fiber at approximately −19.4° from the reference surface and also from the longitudinal axis of the optical fiber retained in the V-groove. Therefore, current devices utilizing the end facet mirror of the V-groove to launch light through an end of the optical fiber cause much of the light to be reflected away from the axis of the optical fiber resulting in non-optimal signal transmission performance.

Applicant recognizes that there is a need for an improved optical coupling between the optical component and the optical fiber conduit. In particular, Applicant identifies the need for an interposer that can be prepared using high-volume, economical manufacturing techniques. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a highly-manufacturable optical assembly by using a diffractive optical element (DOE) to couple light between a waveguide and an optical conduit as reflected by a facet of an interposer. The DOE coupler is highly configurable and is able to reshape and focus light onto different optical media. Of particular importance herein is the ability of the DOE to reshape and focus light having an oblong or elliptical spot shape as would result from light bending at non-perpendicular angles. The ability to focus and couple light that is reflected at non-perpendicular angles is beneficial as it allows the interposer to be formed with reflective facets that are not necessarily at a 45 degree angle to the axis of light propagation. Accordingly, rather than forming the light bending facet in the interposer by machining a 45 degree angle into its substrate, the light bending facet can be formed instead along the crystalline plane angle of the substrate by wet etching. Wet etching facilitates high volume, economical and extremely precise manufacturing of the interposer.

Accordingly, one aspect of the invention is an optical assembly comprising a DOE coupler. In one embodiment, the optical assembly comprising: (a) a crystalline substrate having a top planar surface and a crystalline plane angle; (b) at least one groove defined in the top planar surface and having side walls extending from an edge of the substrate to a terminal end, the groove having a first facet at the terminal end, the first facet having a first angle relative to the top planar surface, the first facet being reflective; (c) an optical conduit having an optical axis and an end face optically coupled with the first facet; (d) a waveguide; and (e) a diffractive optical element (DOE) disposed above the first facet and configured to couple light between the waveguide and the optical conduit as reflected by the first facet.

Another aspect of the invention is an optical component for use in the optical assembly described above. In one embodiment, the optical component comprises (a) a diffractive optical element (DOE); (b) at least one optical waveguide having an adiabatic transition portion optically coupled to the DOE, the DOE being configured to image the expanded waveguide via a mirror facet of the interposer onto an optical conduit end face matching the fiber mode size and numerical aperture characteristic.

Yet another aspect of the invention is an interposer for use in combination with the optical component described above. In one embodiment, the interposer comprises: (a) a crystalline substrate having a top planar surface and a crystalline plane angle; (b) at least one groove defined in the top planar surface and having side walls extending from an edge of the substrate to a terminal end, the groove having a first facet at the terminal end, the first facet having a first angle relative to the top planar surface, the first facet being reflective, the groove configured to receive an optical conduit having an optical axis and an end face optically coupled with the first facet; and (c) bonding pads configured to match precisely a bonding pad configuration on the optical component to position the DOE on the optical component precisely over the first facet.

DETAILED DESCRIPTION

Figure 1:
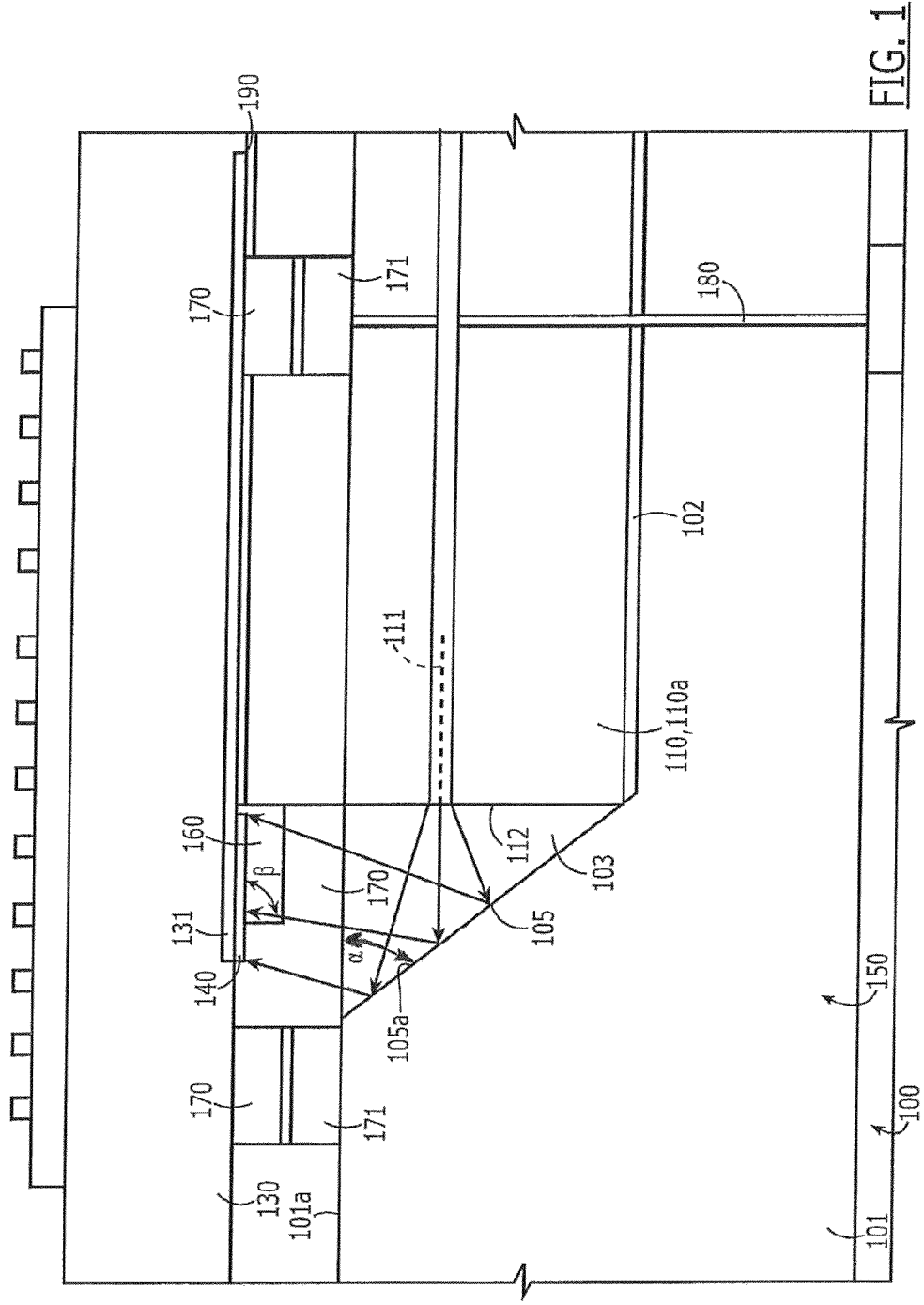
FIG. 1 shows a close-up cross section of an interposer in a subassembly of the present invention.
Figure 2:
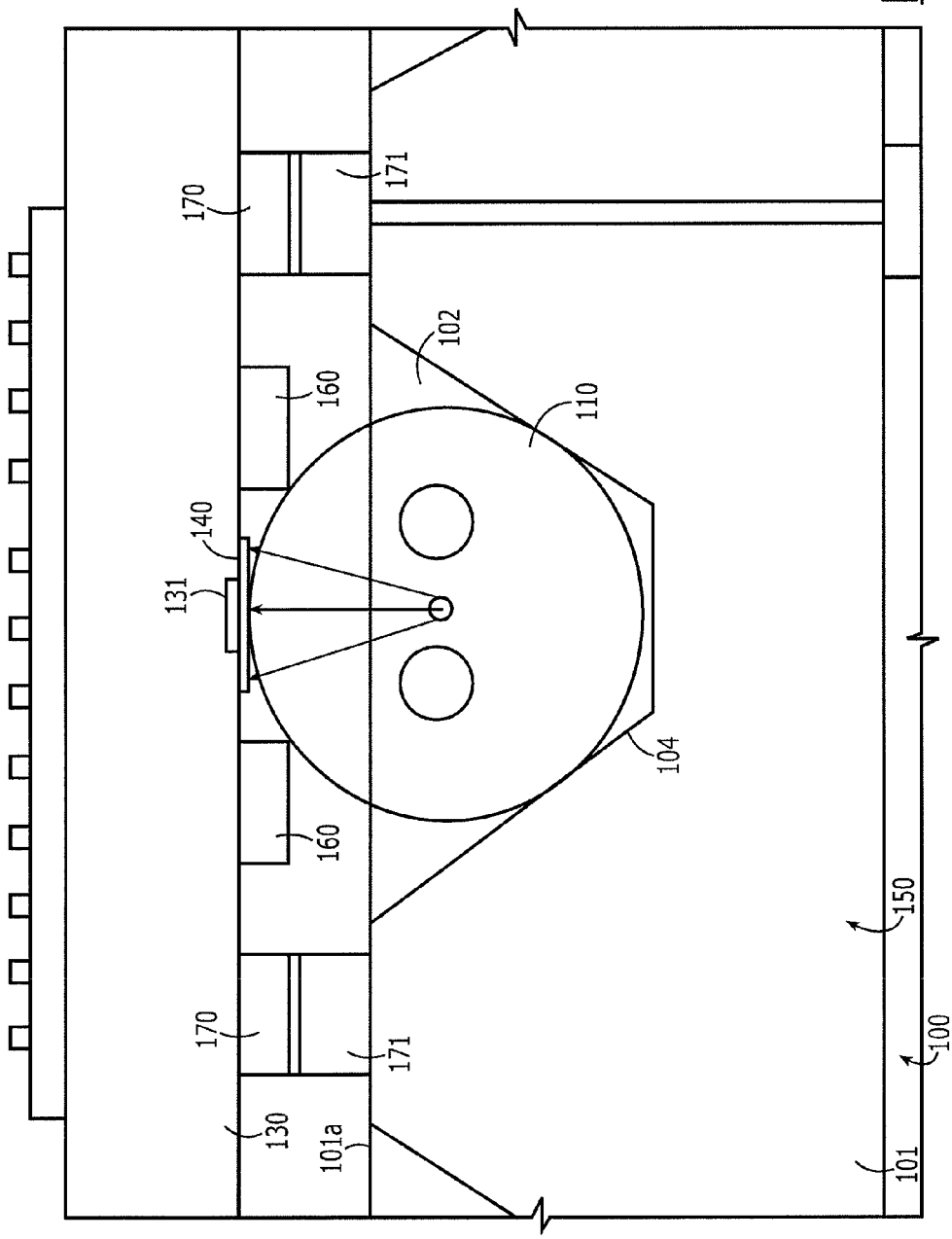
FIG. 2 shows a front view of the interposer shown in FIG. 1.
Figure 3:
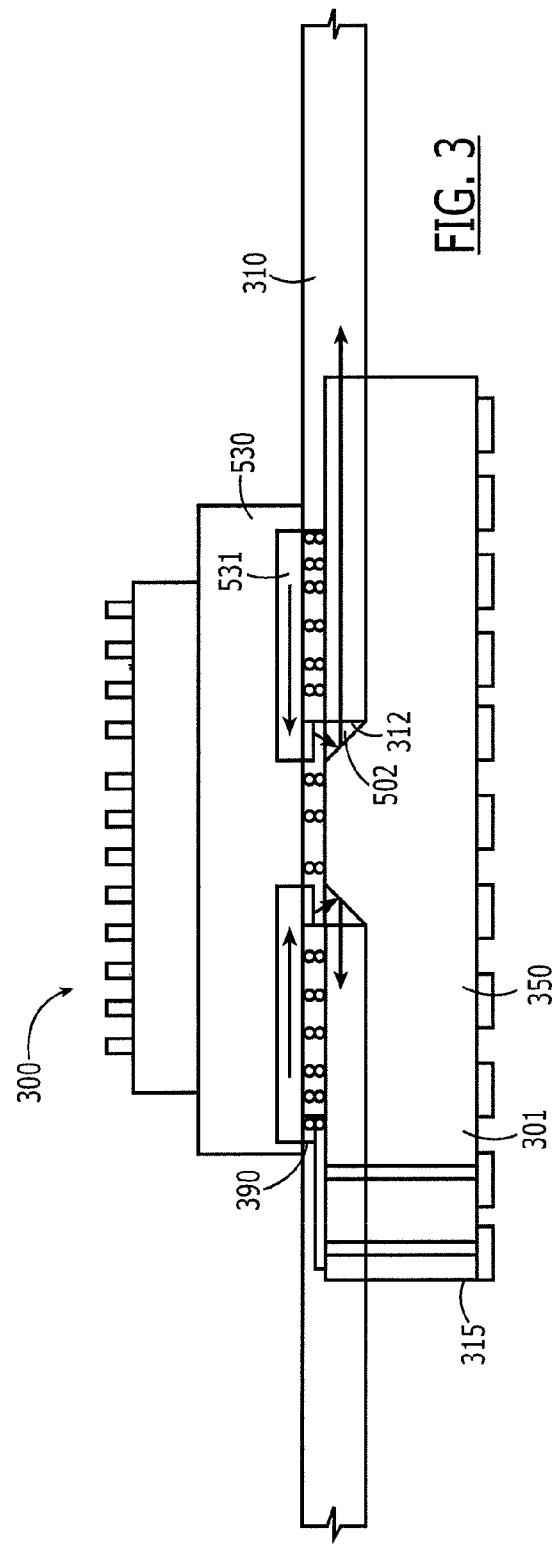
FIG. 3 shows a cross section of a subassembly using the interposer shown in FIG. 1.

Referring to FIGS. 1 and 2, one embodiment of subassembly 100 of the present invention is shown. The subassembly 100 comprises an interposer 150, which comprises a crystalline substrate 101 having a top planar surface 101a and a crystalline plane angle α. At least one groove 102 is defined in the top planar surface 101a. The groove 102 has side walls 104 that extend from an edge 315 (see FIG. 3) of the substrate to a terminal end 103. The groove has a first facet 105 at the terminal end 103. The first facet 105 has a first angle relative to the top planar surface. The first facet 105 is reflective and, in one embodiment, has a reflective coating 105a to be a mirror surface. Disposed in the groove 102 is an optical conduit 110 having an optical axis 111 and an end face 112 optically coupled with the first facet 105. The subassembly also comprises a waveguide 131 disposed above the substrate 101. A diffractive optical element (DOE) is disposed above the first facet 105 and is configured to couple light between the waveguide and the optical conduit as reflected by the first facet. Each of these elements and selected alternative embodiments are described in greater detail below.

A primary function of the interposer is to provide a substrate or backbone to support, align and secure the fiber, optical component(s) and associated electrical circuitry. To this end, it should comprise a rigid material that can be etched or machined to define the grooves and which is thermally stable, suitable for being heated to temperatures typical in solder reflow applications.

To facilitate manufacturability, in one embodiment, the substrate comprises a crystalline material having a crystalline plane angle. Such materials are known to wet etch along the crystalline plane angle, resulting in a predicable and highly precise groove. Wet etching can also be performed on wafer scale, thereby defining all the grooves and facets in the substrate in a single simultaneous operation. In one embodiment, even the sides of the individual interposers are defined in this operation. An example of a suitable crystalline material is silicon.

In one embodiment, the parallel side walls 104 of the groove hold the optical conduit in place. Although single fiber applications are shown and described herein, it should be appreciated that the invention is not limited to single fiber applications and may be applied to arrays of fibers, ribbon fiber, and planar waveguides. Additionally, in one embodiment, the substrate defines multiple grooves. Although not necessary, in this embodiment, the grooves are preferably parallel. Among other benefits, parallel grooves facilitate a common first facet (described below).

The sidewalls may be the walls of a traditional V-groove, or they may be perpendicular to the top planar surface such that they form more of a U-groove. Wet or dry etching or machining may be used to form grooves, although wet etching is generally preferred (although not necessary) as it facilitates manufacturability as mentioned above.

An important aspect of the present invention is the first facet 105 at the terminal end 103. In one embodiment, the first facet 105 is at an angle α determined by the crystalline plane of the substrate as the result of wet etching. For example, in a silicon substrate, traditional wet etching will result in a V-groove having a wall slope of 54.7° as mentioned above and shown in FIG. 1. Aside from low cost, high volume manufacturability, wet etching offers higher speed of etch and better accuracy of the end facet angle than when using dry etching techniques. Wet etching avoids manufacturing tolerances on the end facet angle associated with equipment setup and process because the crystalline plane of the substrate dictates the end facet angle when wet etching.

In one embodiment, a discrete first facet is etched for each groove. Alternatively, in another embodiment, a common first facet is formed by etching a cross groove across multiple grooves 102 at the terminal end 103. By etching a common cross groove across the grooves 102 to define the first facet 105 in one step, economies of scale are realized and continuity among the different first facets is assured. However, an interposer with a common first facet does not have the degree of optical isolation between grooves as does a substrate with discrete first facets.

In one embodiment, the side walls are etched deeper than the first facet to define a step (not shown). In other words, the first facet is etched such that its lower edge is below the optical axis, but above the bottom of the groove. This embodiment facilitates passive axial alignment of the optical conduit in the groove by having the end face of the optical conduit abut the step.

In one embodiment, at least a portion of the first facet is treated to make it more reflective. In one embodiment, treating the surface involves coating it with a metal or other reflective material to make the first facet a mirror as is known in the art. Suitable reflective materials include, for example, gold, silver, aluminum and dielectrics. The materials may be deposited on the facets using known techniques, including, evaporation, sputtering and vapor deposition.

Most if not all of the critical alignment relationships of the interposer may be defined on the wafer scale, often in just a few, or even a single, photolithography step. Specifically, the location of the grooves for holding the fiber and the contact pads/pillars for electrically connecting and providing passive alignment of the optical components may be defined in a single masking step. Additionally, in one embodiment, the optical/electrical interconnections among the various components may be defined in a single masking step. For example, the various traces interconnecting the pads/pillars for the optical component and the pads for the electrical driver circuitry, and the traces between the driver circuitry and the through substrate vias may be defined in a single masking step. In one embodiment, even the edges of the interposers are defined in the same masking step. In other words, each locator edge of the interposer is one half of a dicing groove etched in the wafer. The wafer is simply parted at the flat bottom of each dicing groove to form locator edges defined by the crystalline plane angle of the substrate. This way, the distance from the edge of the interposer to critical features such as the grooves 102 may be precisely controlled, often in a single step, thereby eliminating tolerance build up and simplifying assembly manufacturing with the interposer The optical conduit 110 may be any known medium for transmitting light. In the embodiment of FIG. 1, the optical conduit 110 is an optical fiber 110a. The fiber 110a may be a single mode, a multimode, or a polarization-maintaining single mode fiber. The fiber may be a long fiber or it may be pigtail for splicing or connection to a longer length of fiber. If the fiber is a pigtail it may be beneficial to use a fiber of smaller diameter. For example, commercially-available 80 micron diameter fiber may be used. Using fiber with a smaller diameter provides for more narrow grooves and less etching of the substrate surface, leaving more of the substrate top surface available for other purposes. Additionally, a narrower groove translates into a shorter optical path between the front face of the fiber and DOE via the first facet. The shorter path results in less expansion of the beam and therefore reduces the size of the DOE required. Thus, a smaller diameter fiber has a number of key advantages.

Although an optical fiber 110a is shown in the embodiment of FIG. 1, it should be understood that any optical conduit may be used. Suitable optical conduits include, for example, discrete fibers, ribbon fibers, and planar waveguides. The use of such planar waveguides is known and is described for example in U.S. patent application Ser. No. 13/017,668 (hereby incorporated by reference.)

The end face 112 may be configured in a variety of ways. For example, in the embodiment shown in FIG. 1, the end face 112 is normal to the optical axis 111. Such a configuration facilitates manufacturability as a right angle cleave is readily performed using well known mechanical and laser cleaving techniques. Additionally, in one embodiment, a normal end face 112 facilitates axial alignment of the optical conduit 110 in the groove 102 by having the end face abut a step etched into the substrate (as mentioned above) or a stop on a second substrate (as described below). Alternatively, the end face 112 may be cleaved at the first angle α such that it physically contacts the first facet 105, thereby eliminating air gap. Such a configuration requires more sophisticated cleaving and prevents the fiber from being rotated for tuning, although the physical contact between the end face and the first facet reduces Fresnel losses. (If an air gap does exist as one would with the end face that is normal to the optical axis 111, index matching gel may be used to reduce Fresnel losses.) In yet another embodiment, it may be desirable in certain applications to further profile the end face 112 of the fiber 110 for additional optical performance and/or passive alignment. For example, side facets may be added to the fiber end face on either side of the first mating facet to enhance optical coupling (see, for example, U.S. application Ser. No. 12/510,954). Furthermore, it may be desirable to shape the end face 112 with an upper face that is angled to avoid interfering with the beam 170 and the DOE 140.

The fiber 110a may be secured to the groove in a variety of known ways. For example, the fiber may be metalized and soldered in place or it may be glued in place. In one embodiment, a UV-cured, optically transparent adhesive is used to secure the fiber in the groove. In one embodiment, the fiber 110a is a pigtail having a free distal end (not shown) to facilitate splicing or connection to another fiber. For example, the fiber 110a may be connected to a fiber in an optical fiber circuit, or the fiber 110a may be a fiber directly from an optical fiber circuit.

An important aspect of the present invention is the diffractive optical element (DOE) which is a thin phase element that operates by means of interference and diffraction to produce calculated distributions of light. (DOEs are sometimes also referred to as gratings, holographic optical elements, and sub-wavelength diffraction gratings.) In particular, the DOE 140 is configured to couple light between the waveguide and the optical conduit as reflected by the first facet, and, in so doing, matching the optical conduit's mode size and numerical aperture characteristic and the waveguide's mode size and characteristic including any mode size conversion resulting from, for example, the use of an adiabatic taper waveguide transition section on the waveguide. Because the light beam expands from the end face of the optical conduit to the surface of the DOE and because, in one embodiment, the light beam is elongated by virtue of being reflected from a first facet which is not 45 degrees, the DOE must be configured to focus and reshape this beam to propagate along the waveguide. Specifically, in the embodiment in which the first facet is etched along the crystalline plane of silicon, the first angle will not be 45 degrees but rather the crystalline plane angle, which, for silicon is 54.7 degrees. Therefore light reflected by the first facet will strike the plane of the substrate at a non-perpendicular, nominal second angle β, which in the case of silicon substrate, will be about 19.4 degrees (relative to the normal to the planar surface 101a) to complement reflection from the crystalline plane angle of 54.7 degrees. The non-perpendicular angle results in an oblong or elliptical spot shape on the DOE which must be reshaped and focused by the DOE to be launched onto the waveguide. A properly configured DOE should not only shape and focus the light emitted from the fiber conduit as reflected by the first face onto the waveguide, but also work in reverse to reshape and focus light emitted from the waveguide onto the first face and the optical conduit. Such a shaping and focusing may be achieved through interference and diffraction as mentioned above using arcs, ridges, pillars, etc. in the DOE. Aside from configuring the DOE to shape and focus the light to accommodate the non-perpendicular second angle as mentioned above, the DOE should be configured for different interfaces with the optical conduit. For example, in one embodiment, it would be configured for air pass, and, in other embodiment, for index matching gel.

Figure 5:
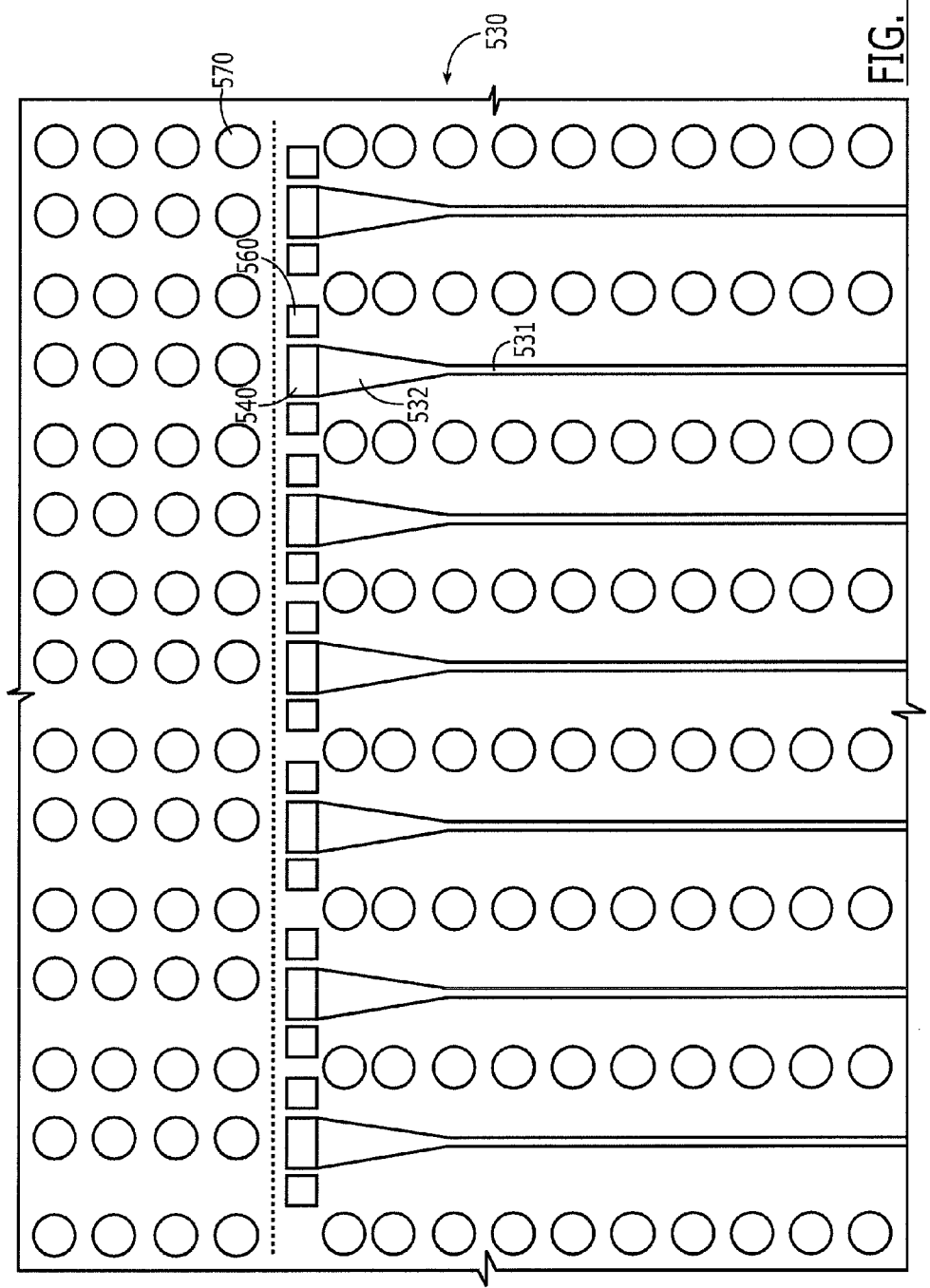
FIG. 5 shows one embodiment of the pillar configuration on the bottom surface of the optical component of the interposer shown in FIG. 1.

The DOE should have an area at least the size of the spot size of the beam 170. In this respect, it should be noted, as mentioned above, that the spot size will be larger than a cross section of the beam because the beam is incident at the DOE at a non-perpendicular angle. Unlike traditional lenses, a DOE may be made larger than the expected spot size to catch errant light along the perimeter because one can calculate the incident angle of the errant light on the DOE at any location and incorporate the necessary structures to shape and focus the light based on the known angle. Accordingly, a relatively large DOE surface area is generally preferred. For example, as shown in FIG. 5, which is the bottom view of the optical component 530, the DOE 540 has a width of about 35 microns.

The preparation of such DOEs is known, and, described, for example, FREDERIK VAN LAERE, ET AL., *Compact Focusing Grating Couplers for Silicon-on-Insulator Integrated Circuits*, IEEE PHOTONICS TECHNOLOGY LETTERS, VOL. 19, NO. 23, (Dec. 1, 2007); TINGDI LIAO, ET AL., *High-Efficiency Focusing Waveguide Grating Coupler with Parallelogramic Groove Profiles*, JOURNAL OF LIGHTWAVE TECHNOLOGY, VOL. 15, NO. 7 (July 1997); LUKAS CHROSTOWSKI, *Optical Gratings: Nano-engineered Lenses*, NATURE PHOTONICS, VOL 4 (July 2010); DAVID FATTAL, ET AL., *Flat Dielectric Grating Reflectors with Focusing Abilities*, NATURE PHOTONICS, VOL 4 (July 2010); G. J. SWANSON, *Binary Optics Technology: The Theory and Design of Multilevel diffractive optical elements*; LINCOLN LABORATORY, MASSACHUSETTS INSTITUTE OF TECHNOLOGY, Technical Report 854 (14 Aug. 1989), and U.S. Pat. No. 5,657,407, all of which are hereby incorporated by reference. A suitable DOE would include, for example, a two-dimensional high index contrast focusing DOE. One skilled in the art in light of this disclosure can produce a suitable DOE without undue experimentation.

The DOE 540 is interfaced with a waveguide 531 using known techniques such as an adiabatic taper waveguide transition. As shown in FIG. 1, the waveguide 131 on the optical component 130 is essentially parallel to the planar surface

101*a* of the interposer, although other configurations are possible. Suitable waveguides include, for example, Silicon On Insulator (SOI) wire, rib waveguides, or even optical fiber. Because the DOE has a surface area at least as large as the spot size of the light beam 170 as mentioned above, and waveguides tend to be more narrow (e.g. 0.5 microns), this embodiment of the waveguide 531 comprises an adiabatic transition portion 532 as shown in FIG. 5. Generally a gradual taper down to the width of the waveguide 513 is preferred to minimize propagation loss in the transition.

In the embodiment of FIG. 1, the waveguide 131 is integral to the optical component 130. It should be understood, however, that the waveguide may be discrete and freestanding from the optical component. Alternatively, the waveguide and DOE may be disposed on a second substrate (not shown). The second substrate may be for example, silicon, PCB, flex material, glass, and polyamide. In such an embodiment, the pads/pillars for alignment and thermal/electrical interconnection with the interposer as described below in connection with the optical component may be used as well with the second substrate. In this respect, it should be noted that the invention may be practiced without a fully integrated optical component.

The optical component 130 may be any known or later-developed application specific photonic component that can be optically coupled to a fiber. The optical component may be for example: (a) an optoelectric device (OED), which is an electrical device that sources, detects and/or controls light (e.g. photonics processor, such as, a CMOS photonic processor, for sending/receiving optical signals, processing the signals and transmitting responsive signals, electro-optical memory, electro-optical random-access memory (EO-RAM) or electro-optical dynamic random-access memory (EO-DRAM), and electro-optical logic chips for managing optical memory (EO-logic chips), lasers, such as vertical cavity surface emitting laser (VCSEL), double channel, planar buried heterostructure (DC-PBH), buried crescent (BC), distributed feedback (DFB), distributed bragg reflector (DBR); light-emitting diodes (LEDs), such as surface emitting LED (SLED), edge emitting LED (ELED), super luminescent diode (SLD); and photodiodes, such as P Intrinsic N (PIN) and avalanche photodiode (APD)); (b) a passive component, which does not convert optical energy to another form and which does not change state (e.g., fiber, lens, add/drop filters, arrayed waveguide gratings (AWGs), GRIN lens, splitters/couplers, planar waveguides, or attenuators); or (c) a hybrid device which does not convert optical energy to another form but which changes state in response to a control signal (e.g., switches, routers, modulators, attenuators, and tunable filters). It should also be understood that the optical component may be a single discrete device or it may be assembled or integrated as an array of devices.

In one embodiment, the optical component 130 and the substrate 101 cooperate to form a closely toleranced channel 190 in which to receive the optical conduit 110. More specifically, referring to FIG. 3, which shows an optical subassembly 300 having an interposer 350 connected to an optical component 530. The optical component is positioned precisely above the groove 502, providing a predetermined clearance above the optical conduit 310 when the conduit is inserted into the groove. Depending on the magnitude of the predetermined clearance, a minimum groove length may be determined to ensure that the angular misalignment of the optical axis 111 of the optical conduit is maintained within a certain range. For example, Applicant has determined that a 2 micron clearance requires a groove that is about 230 microns long to ensure that the optical axis misalignment is less than 0.5 degrees. Lower clearances require shorter groove lengths, although, as the clearance is lowered, the difficulty in inserting the optical conduit 310 in the channel 390 is increased. One of skill in the art, in light of this disclosure, will be able to determine the minimum groove length based on an optimized clearance.

Figure 4:
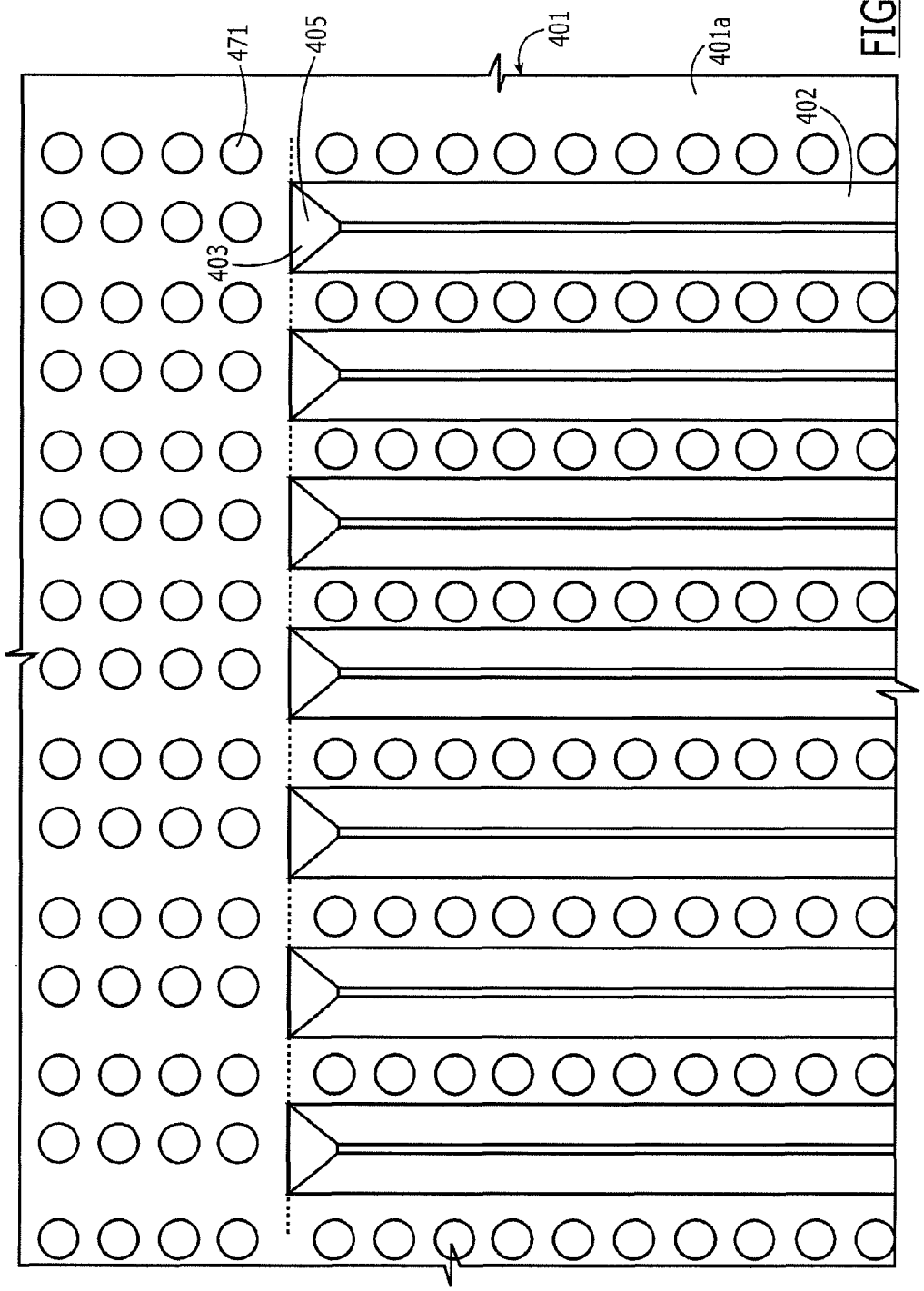
FIG. 4 shows one embodiment of the pillar configuration on the top planar surface of the substrate of the interposer shown in FIG. 1.

The precise positioning of the optical component above the groove can be achieved in a variety of ways. In the embodiment of FIG. 1, the spacing between the groove and the optical component is controlled by pillars 170, 171 that are deposited on the optical component and substrate, respectively. Specifically, referring to FIGS. 4 and 5, layouts for the planar surface 101*a* of the substrate 101 and the bottom surface of the optical component 530 are shown. (It should be understood that the surface shown in FIG. 5 is referred to as the bottom surface with the respect to its position in the subassembly 100. However, one of skill in the art will recognize that this surface may actually be the top surface of a chip which is "flip-chipped" onto the substrate as is well known.) Each layout depicts pillars for supporting the optical component and for electrically connecting the optical component to the substrate, and for facilitating thermal conduction between to the optical component and the substrate to aid in cooling the optical component. For example, referring to FIG. 4, the planar surface 401*a* of the substrate 401 is shown which a plurality of grooves 402 etched therein. Also shown are the first facets 405 defined at the terminal ends 403 of each groove 402. Pillars 471, in this embodiment, copper pillars, are defined over the planar surface 401*a*. Pillars 471 have corresponding pillars 570 on the bottom side of the optical component 530 as shown in FIG. 5.

The pillars function not only to precisely position the optical component over the substrate, but also to precisely align the optical component with the substrate. That is, solder between the complementary pillars 471 and 570 can be used to passively align the optical component with the substrate during a reflow operation. To this end, the optical component is placed on the substrate such that the pillars 471, 570 are in rough alignment using known pick and place technology. Alignment between the substrate and optical component is achieved when the assembly is reflowed such that the surface tension of the solder on the pillars causes the pillars to align, thereby precisely positioning the optical component relative to the grooves of the substrate. Such a mechanism is similar to that disclosed in U.S. Pat. No. 7,511,258, incorporated herein by reference. Alternatively, rather than solder reflow, thermo-compression bonding may be used to directly join the complementary pillars.

In addition to pillars 570 on the optical component for positioning the optical component relative to the substrate, pillars 560 (pillars 160 in FIG. 1) may be used as mechanical stops to axially position the fiber end face relative to the position of the DOE 540. Unlike the support pillars 570, which are round, the pillars 560 in this embodiment are rectangular to provide straight edges and surfaces against which the optical conduit end face 112 abuts. More specifically, referring back to FIGS. 1 and 2, the pillars 160 prevent the optical conduit 110 from urging upward as the end face 112 is forced into the inclined first facet 105. In one embodiment, pillars 570 and 560 are the same height to facilitate manufacturability. Rather than using pillars to prevent the optical conduit from ramping up on the first facet, the channel may be used to control the degree to which the optical conduit moves. More specifically, in one embodiment, the end face of the optical conduit may be angled to match the first face, as described above. Such a configuration facilitates a camming action between the first facet and the front face to move the end face upward as it is pushed into the groove. If the clearance above the optical conduit is precisely controlled by the position of the optical component and if the end face can be cleaved to match the first face when the optical conduit abuts the bottom of the optical component, then precise positioning of the optical conduit may be achieved by pushing the fiber forward until to abuts the bottom of the optical component and its end face makes physical contact with the first facet. Still other alignment approaches will be known to those of skill in the art in light of this disclosure.

In another embodiment, rather than or in addition to solder pads, other fiducials on the interposer are used to facilitate passive alignment. Fiducials may be any structure or marking which provides for the passive alignment of the optical component. A variety of fiducials may be used. For example, the fiducials may be physical structures protruding from the planar surface that provide a register surface against which the edge of the optical component may contact to be positioned correctly on the interposer. Alternatively, the fiducials may be markings to enable visual alignment of the optical component on the interposer using a commercially-available, ultra-high precision die bonding machine, such as, for example, a Suss MicroTec machine (See, e.g., U.S. Pat. No. 7,511,258). Additionally, a combination of fiducials and contact pads may be used. For example, the pads may be used to pull the optical component into contact with the raised fiducials of the interposer. Still other alignment techniques will be apparent to one of skill in the art in light of this disclosure.

It should be understood that other known features may be incorporated into the subassembly of the present invention. For example, in one embodiment, the substrate comprises Through Substrate Vias (TSVs) and thermal vias 180 as shown in FIG. 1. Likewise, the bottom of the substrate 101 may contain pads for facilitating electrical connections as is known in the art through interface with a printed circuit board or flexible circuit.

Based on the description herein, one embodiment of the invention is an interposer having a reflective mirror surface formed along the crystalline plane of a V-groove end facet. The interposer substrate provides a means for aligning a surface mounted photonics IC chip having a DOE to the reflective mirror surface. The DOE is configured to transmit and receive light to and from the reflective mirror surface providing efficient coupling to an optical fiber conduit retained in the V-groove of the interposer. In one embodiment, the interposer comprises: (a) a crystalline substrate having a top planar surface and a crystalline plane angle; (b) at least one groove defined in the top planar surface and extending from an edge of the substrate to a terminal end, the groove having side walls and a first facet at the terminal end, the first facet having a first angle relative to the top planar surface, the first angle being precisely at the crystalline plane angle of the substrate, the first facet being made reflective; (c) interposer bonding pads formed on the top planar surface, configured in precise locations relative to the first facet; (d) redistribution layer electrical interconnections formed on the top planar surface to join the interposer bonding pads to top side redistribution layer contact pads, (e) optional through substrate vias to electrically interconnect top side redistribution layer contact pads to back side contact pads, and (f) optional back side redistribution layer electrical interconnections formed on the bottom planar surface of the substrate to join through substrate vias to back side contact pads in alternate locations on the back side of the interposer.

Another embodiment of the invention is a photonics IC chip having at least one optical waveguide which is efficiently coupled by an adiabatic transition to a waveguide DOE coupler for optical interconnection to and from the chip. The waveguide DOE coupler is designed to image the expanded waveguide via the interposer mirror facet onto the fiber conduit end face, matching the fiber mode size and numerical aperture characteristics. The chip also has bonding pads configured to precisely match the bonding pad configuration on the interposer. The bonding pads provide mechanical assembly and positioning of the photonic IC features to the interposer features, and provide electrical and thermal interconnection between the photonics IC and the interposer. Specific pads on the photonics IC chip interact with the optical fiber conduit to provide a mechanical fiber stop. The position of the mechanical fiber stop locator pads can be precisely placed on the photonics IC chip relative to the position of the waveguide DOE coupler.

In yet another embodiment, the invention is an assembly comprising the interposer described above assembled with a photonics IC as described above in combination, optionally, with an optical fiber conduit and an electrical pc board or flex circuit. The photonics IC is mounted onto the top surface of the interposer using the matched bonding pads in order to configure a precise location of the interposer facet mirror relative to the photonic IC waveguide DOE coupler. The bottom surface of the photonic IC is spaced apart from the top surface of the interposer at a precise height as determined by the bonding pads. The bonding height and geometry of the interposer V-groove determine the amount of clearance provided for the insertion of the optical fiber conduit. The mechanical fiber stop locator pads on the photonic IC are designed to prevent the fiber end from riding up the surface of the interposer facet mirror during insertion. The alignment geometry of the fiber end face-to-mirror-to waveguide DOE coupler is determined by the interposer-photonic IC subassembly. The angular control of the fiber conduit is determined by the insertion clearance and insertion distance. The distance from the edge of the photonic IC to the coupling location is sufficient to provide control of the angular alignment of the fiber conduit and to provide length for the adiabatic transition from the waveguide to the waveguide DOE coupler geometry on the photonic IC. In one embodiment, the subassembly comprises: (a) a crystalline substrate having a top planar surface and a crystalline plane angle; (b) at least one groove defined in the top planar surface and extending from an edge of the substrate to a terminal end, the groove having side walls and a first facet at the terminal end, the first facet having a first angle relative to the top planar surface, the first angle being precisely at the crystalline plane angle, the first facet being made reflective; (c) an optical fiber conduit having an optical axis and an end face optically coupled with the first facet in cooperation with the substrate groove and mechanical stop features and bottom surface of the photonic IC; (d) a waveguide DOE coupler disposed above the first facet and configured to transmit/receive light to and from the first facet at a second group of angles, the second group of angles being non-perpendicular to the substrate top planar surface; (e) a photonic IC component with at least one waveguide optically coupled by adiabatic transition to the waveguide DOE coupler; and (f) an electrical flex circuit or printed circuit board electrically connected to the interposer on either the top or bottom surface of the interposer.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

What is claimed is:

1. An optical assembly comprising:
a crystalline substrate having a top planar surface and a crystalline plane angle;
at least one groove defined in said top planar surface and having side walls extending from an edge of said substrate to a terminal end, said groove having a first facet at said terminal, said first facet having a first angle relative to said top planar surface, said first facet being reflective;
an optical conduit having an optical axis and an end face optically coupled with said first facet;
a waveguide;
an optical component having a bottom surface; and
a diffractive optical element (DOE) disposed on said bottom surface of said optical component such that said DOE is disposed above said first facet and configured to couple light between said waveguide and said optical conduit as reflected by said first facet.

2. The optical interposer of claim 1, wherein said first facet is produced by wet etching said substrate.

3. The optical assembly of claim 2, wherein said first angle is said crystalline plane angle.

4. The optical assembly of claim 3, wherein said substrate is silicon and said first angle is about 54.7°.

5. The optical assembly of claim 3, wherein light beam between said DOE and said first facet is at a nominal second angle, said second angle being non-perpendicular to said planar surface signal.

6. The optical assembly of claim 1, wherein said waveguide is integrated into said optical component.

7. The optical assembly of claim 1, wherein said optical component is a photonics integrated circuit.

8. The optical assembly of claim 7, wherein said photonics integrated circuit is a processor.

9. The optical assembly of claim 1, wherein said optical conduit is an optical fiber.

10. The optical assembly of claim 9, wherein said end face is normal to said optical axis.

11. An optical assembly comprising:
a crystalline substrate having a top planar surface and a crystalline plane angle;
at least one groove defined in said top planar surface and having side walls extending from an edge of said substrate to a terminal end, said groove having a first facet at said terminal, said first facet having a first angle relative to said top planar surface, said first facet being reflective;
an optical conduit having an optical axis and an end face optically coupled with said first facet;
a waveguide;
a diffractive optical element (DOE) disposed above said first facet and configured to couple light between said waveguide and said optical conduit as reflected by said first facet; and
an optical component optically coupled to said waveguide, wherein said optical component comprises at least one stop for axially positioning said fiber in said groove.

12. The optical assembly of claim 11, wherein said stop comprises at least one pillar disposed over said first facet to prevent said fiber from moving upward.

13. An optical assembly comprising
a crystalline substrate having a top planar surface and a crystalline plane angle;
at least one groove defined in said top planar surface and having side walls extending from an edge of said substrate to a terminal end, said groove having a first facet at said terminal, said first facet having a first angle relative to said top planar surface, said first facet being reflective;
an optical conduit having an optical axis and an end face optically coupled with said first facet;
a waveguide;
a diffractive optical element (DOE) disposed above said first facet and configured to couple light between said waveguide and said optical conduit as reflected by said first facet; and
an optical component optically coupled to said waveguide, wherein said substrate and said optical component comprise complementary pillars of a certain height to ensure clearance for said optical conduit in said groove.

14. The optical assembly of claim 13, wherein said clearance is about 2 microns.

15. The optical assembly of claim 14, wherein said groove is sufficiently long to limit angular misalignment of said optical axis relative to said planar surface to no more than 0.5 degrees.

16. The optical assembly of claim 15, wherein said groove has a length of at least 230 microns.

17. The optical assembly of claim 13, wherein said pillars are copper pillars.

18. An optical component for mounting on an interposer containing an optical conduit, said optical component comprising:
a diffractive optical element (DOE);
at least one optical waveguide having an adiabatic transition optically coupled to said DOE, said DOE being configured to image said optical waveguide via a mirror facet of said interposer onto the optical conduit end face matching the optical conduit mode size and numerical aperture characteristic.

19. The optical component of claim 18, further comprising bonding pads configured to match a bonding pad configuration on said interposer.

20. The optical component of claim 19, wherein said bonding pads provide mechanical positioning of said optical component relative to said interposer, and provide electrical and thermal interconnection between said optical component and said interposer.

21. The optical component of claim 18, further comprising pillars to interact with the optical conduit in said interposer to provide a mechanical fiber stop to axially position said optical conduit in said interposer.

22. An interposer for use with the optical component of claim 18, said interposer comprising:
a crystalline substrate having a top planar surface and a crystalline plane angle;
at least one groove defined in said top planar surface and having side walls extending from an edge of said substrate to a terminal end, said groove having a first facet at said terminal, said first facet having a first angle relative to said top planar surface, said first facet being reflective, said groove configured to receive an optical conduit having an optical axis and an end face optically coupled with said first facet; and bonding pads configured to match a bonding pad configuration on said optical component, to position said DOE on said optical component over said first facet.

23. The interposer of claim 22, wherein said first facet is at the same angle as said crystalline plane angle.

* * * * *